US008873553B2

United States Patent
Ogura

(10) Patent No.: US 8,873,553 B2
(45) Date of Patent: Oct. 28, 2014

(54) SWITCH SYSTEM, LINE CARD AND LEARNING METHOD OF FDB INFORMATION

(75) Inventor: Naoto Ogura, Tokyo (JP)

(73) Assignee: NEC Corporation, Tokyo (JP)

( * ) Notice: Subject to any disclaimer, the term of this patent is extended or adjusted under 35 U.S.C. 154(b) by 113 days.

(21) Appl. No.: 13/433,212

(22) Filed: Mar. 28, 2012

(65) Prior Publication Data

US 2012/0250684 A1    Oct. 4, 2012

(30) Foreign Application Priority Data

Mar. 30, 2011    (JP) .................................. 2011-075425

(51) Int. Cl.
- *H04L 12/28* (2006.01)
- *H04L 12/56* (2006.01)
- *H04L 12/46* (2006.01)

(52) U.S. Cl.
CPC .................................. *H04L 12/4625* (2013.01)
USPC ........... 370/390; 370/401; 370/469; 370/468; 370/229; 370/249; 370/232; 370/412

(58) Field of Classification Search
CPC combination set(s) only.
See application file for complete search history.

(56) References Cited

U.S. PATENT DOCUMENTS

| | | | |
|---|---|---|---|
| 2007/0097864 A1* | 5/2007 | Bernstein ...................... | 370/232 |
| 2008/0049764 A1* | 2/2008 | Solomon et al. .............. | 370/401 |
| 2010/0189119 A1* | 7/2010 | Sawada ......................... | 370/401 |

FOREIGN PATENT DOCUMENTS

JP    2010-177722 A    8/2010

* cited by examiner

*Primary Examiner* — Ian N Moore
*Assistant Examiner* — Eric H Wang
(74) *Attorney, Agent, or Firm* — McGinn IP Law Group, PLLC

(57) ABSTRACT

A representative line card in a switch system that is configured of a layer 2 switching processor and a plurality of line cards connected to the layer 2 switching processor, the plurality of line cards including at least one representative line card, comprising: an FDB table having FDB information entried therein, and; a learning unit that receives a learning notification including the FDB information from the other line cards excluding its own line card via the layer 2 switching processor, determines whether the FDB information of the learning notification has been entried into the FDB table of its own line card, updates the FDB table of its own line card when the FDB information has not been entried, and transmits the learning notification including the FDB information to the other line cards via the layer 2 switching processor with a multicast.

8 Claims, 6 Drawing Sheets

FIG. 3

| SLOT NUMBER | PORT NUMBER | MAC ADDRESS | VLAN ID |
|---|---|---|---|
| 1 | 1 | 00 : 00 : 00 : 00 : 00 : 01 | 100 |
| 1 | 1 | 00 : 00 : 00 : 00 : 00 : 02 | 100 |
| 1 | 1 | 00 : 00 : 00 : 00 : 00 : 01 | 110 |
| 1 | 2 | 00 : 00 : 00 : 00 : 00 : 03 | 100 |
| 2 | 4 | 00 : 00 : 00 : 00 : 00 : 04 | 100 |
| 2 | 4 | 00 : 00 : 00 : 00 : 00 : 04 | 140 |
| 4 | 1 | 00 : 00 : 00 : 00 : 00 : 05 | 1000 |
| | | | |
| | | | |

FIG. 4

| RECEPTION SLOT NUMBER | RECEPTION PORT NUMBER | TRANSMISSION SOURCE MAC ADDRESS | RECEPTION VLAN ID |
|---|---|---|---|

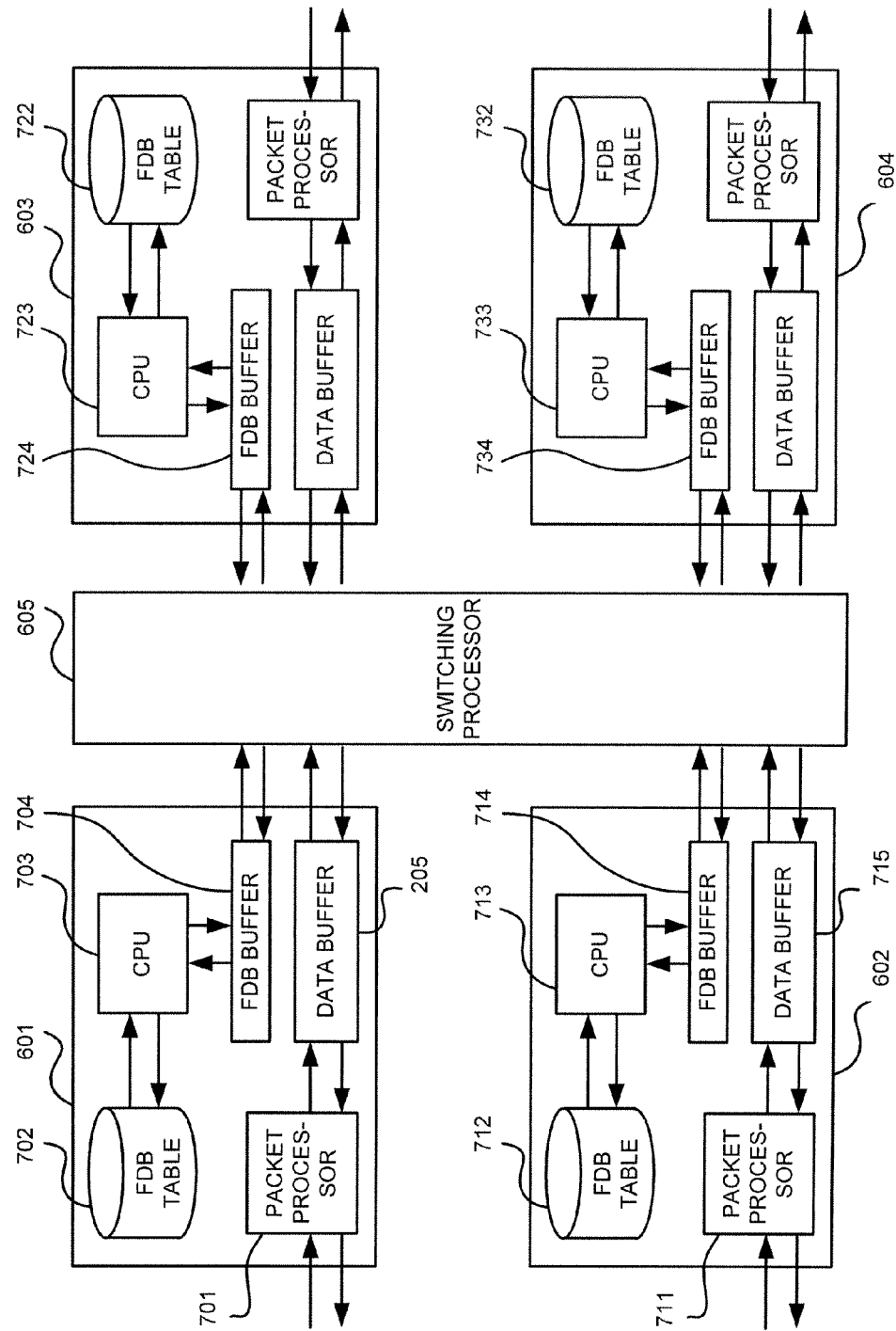

SWITCH SYSTEM, LINE CARD AND LEARNING METHOD OF FDB INFORMATION

INCORPORATION BY REFERENCE

This application is based upon and claims the benefit of priority from Japanese patent application No. 2011-075425, filed on Mar. 30, 2011 the disclosure of which is incorporated herein in its entirety by reference.

BACKGROUND OF THE INVENTION

The present invention relates to a switch system, a line card, a learning method of FDB information and a program therefor.

In a layer-2 switch that is configured of a plurality of line cards 601, 602, 603, and 604, as shown in FIG. 7, the switch apparatus includes line cards that have FDB tables 702, 712, 722 and 732, respectively.

Normally, when the line card 601 receives a certain packet, a packet processor 701 of the line card 601 references the FDB table 702, determiners whether the above packet is a unlearned packet, defines it as a packet that has to be learned when it is a unlearned packet, and transfers a learning notification to an FDB buffer 704.

A CPU 703 reads out the learning notification from the FDB buffer 704, and registers it to the FDB table 702. At this time, all FDB tables need to have identical information in synchronization to each other, whereby the CPU 703 transfers the similar learning notification to the other line cards 602, 603, and 604, and CPUs 713, 723, and 733 of other line cards 602, 603, and 604 register the learning notification to the FDB tables 712, 722 and 732 with the similar process, respectively.

When the line card having received the packet is 602, the CPU 713 performs the similar process. In such a configuration, when the packets being newly received concentrate on a single line card, the CPU of the above line card needs to perform the process of the packets that the above line card itself receives, and the process of the packets that are received from the other line cards, and thus, a load on the CPU is likely to be biased.

Further, there exists the problem that when the learning notification for synchronization being transmitted inside the apparatus and the learning notification for the packet received from the outside are congested with each other, the learning notification cannot be accumulated into the FDB buffer and is cancelled, disagreement of the FDB tables is brought about inside the apparatus, and hence, the packets cannot be normally transferred.

Further, the above line card firstly learns and then makes a notification to the other line cards, and such a congestion situation incurs the case that while above line card has already learned, the other line cards have not learned yet, which causes the problem that disagreement of the FDB tables is brought about.

So as to solve such problems, the invention of Patent literature 1 is proposed.

The switch apparatus described in the Patent literature 1 includes a first card having a L2SW (layer 2 switch) installed therein and a second card. And, in the case of having detected the FDB information that is not present in its own switch, the first card transmits it to the second card, and updates the FDB information of its own switch with the FDB information being transmitted from the second card. Further, the second card collects the FDB information being transmitted from each first card, updates the FDB information of the switch apparatus, and transmits the updated FDB information to each card.

Patent literature 1: JP-P2010-177722A

However, the invention of Patent literature 1 requires a memory for storing the FDB information of each card by the second card collecting the FDB information, and further, includes the layer 2 switching processor to which a special function has to be affixed.

SUMMARY OF THE INVENTION

Thereupon, the present invention has been accomplished in consideration of the above-mentioned problems, and an object thereof is to provide a switch system that is capable of effectively learning the FDB (Forwarding Database) table to be referenced in order to transfer the packets in the technology in which a plurality of the line cards are installed on the layer 2 switch and each line card performs the packet process, a line card, a learning method of the FDB information, and a program therefor.

An object of the present invention lies in point of solving the above-mentioned problems.

The present invention is a switch system that includes a layer 2 switching processor and a plurality of line cards including at least one representative line card, which have been connected to the aforementioned layer 2 switching processor, wherein each line card excluding the aforementioned representative line card includes an FDB table having FDB information entried therein, a packet processing unit that, when the FDB information of a received packet has not been entried into the aforementioned FDB table of its own line card, transmits a learning notification including the aforementioned FDB information to the aforementioned representative line card via the aforementioned layer 2 switching processor, and an updating unit that receives the learning notification including the FDB information coming from the aforementioned representative line card via the aforementioned layer 2 switching processor, and updates the aforementioned FDB table of its own line card, and wherein the aforementioned representative line card includes an FDB table having the FDB information entried therein, and a learning unit that receives the learning notification from the aforementioned line card via the aforementioned layer 2 switching processor, determines whether the FDB information of the aforementioned learning notification has been entried into the aforementioned FDB table of its own line card, updates the FDB table of its own line card when the aforementioned FDB information has not been entried, and transmits the learning notification including the aforementioned FDB information to the other line cards via the aforementioned layer 2 switching processor with a multicast.

The present invention is a representative line card in a switch system that is configured of a layer 2 switching processor and a plurality of line cards connected to the aforementioned layer 2 switching processor, the aforementioned plurality of line cards including at least one representative line card, which includes an FDB table having FDB information entried therein, and a learning unit that receives a learning notification including the FDB information from the other line cards excluding its own line card via the aforementioned layer 2 switching processor, determines whether the FDB information of the aforementioned learning notification has been entried into the aforementioned FDB table of its own line card, updates the FDB table of its own line card when the aforementioned FDB information has not been entried, and transmits the learning notification including the aforementioned FDB information to the other line cards via the aforementioned layer 2 switching processor with a multicast.

The present invention is a line card in a switch system that is configured of a layer 2 switching processor and a plurality of line cards connected to the aforementioned layer 2 switching processor, the aforementioned plurality of line cards including at least one representative line card, which includes an FDB table having FDB information entried therein, a packet processing unit that, when the FDB information of a received packet has not been entried into the aforementioned FDB table of its own line card, transmits a learning notification including the aforementioned FDB information to the aforementioned representative line card via the aforementioned layer 2 switching processor, and an updating unit that receives the learning notification including the FDB information coming from the aforementioned representative line card via the aforementioned layer 2 switching processor, and updates the aforementioned FDB table of its own line card.

The present invention is a learning method of FDB information of a line card in a switch system that is configured of a layer 2 switching processor and a plurality of line cards connected to the aforementioned layer 2 switching processor, which includes the steps of: defining one line card out of the aforementioned plurality of line cards as a representative line card; when the FDB information of a received packet has not been entried into an FDB table of its own line card, transmitting, by each line card excluding the aforementioned representative line card, a learning notification including the aforementioned FDB information to the aforementioned representative line card via the aforementioned layer 2 switching processor; receiving, by the aforementioned representative line card, the learning notification from the aforementioned line card via the aforementioned layer 2 switching processor, determining, by the aforementioned representative line card, whether the FDB information of the aforementioned learning notification has been entried into the FDB table of its own line card, updating, by the aforementioned representative line card, the FDB table of its own line card when the aforementioned FDB information has not been entried, and transmitting, by the aforementioned representative line card, the learning notification including the aforementioned FDB information to the other line cards via the aforementioned layer 2 switching processor with a multicast; and receiving, by each line card excluding the aforementioned representative line card, the learning notification including the FDB information coming from the aforementioned representative line card via the aforementioned layer 2 switching processor, and updating, by each line card excluding the aforementioned representative line card, the aforementioned FDB table of its own line card.

The present invention is a program of a representative line card in a switch system that is configured of a layer 2 switching processor and a plurality of line cards connected to the aforementioned layer 2 switching processor, which causes a CPU of the representative line card to execute a process of, upon receipt of a learning notification including FDB information from the other line cards excluding its own line card via the aforementioned layer 2 switching processor, determining whether the FDB information of the aforementioned learning notification has been entried into an FDB table of its own line card, and a process of updating the FDB table of its own line card when the aforementioned FDB information has not been entried, and transmitting the learning notification including the aforementioned FDB information to the other line cards via the aforementioned layer 2 switching processor with a multicast.

The present invention is a program of a line card in a switch system that is configured of a layer 2 switching processor and a plurality of line cards connected to the aforementioned layer 2 switching processor, the aforementioned plurality of line cards including at least one representative line card, which causes a CPU of the line card to execute a process of, when FDB information of a received packet has not been entried into an FDB table of its own line card, transmitting a learning notification including the aforementioned FDB information to the aforementioned representative line card via the aforementioned layer 2 switching processor, and a process of receiving the learning notification including the FDB information coming from the aforementioned representative line card via the aforementioned layer 2 switching processor, and updating the aforementioned FDB table of its own line card.

In the present invention, a plurality of the line cards are installed on the layer 2 switch, and the FDB (Forwarding Database) table being referenced in order to transfer the packets can be effectively learned in the technology in which each line card performs the packet process.

BRIEF DESCRIPTION OF THE DRAWINGS

This and other objects, features and advantages of the present invention will become more apparent upon a reading of the following detailed description and drawings, in which:

FIG. 3 is a view for illustrating one example of a configuration of an FDB table 212;

FIG. 4 is a view for illustrating one example of information being included in the learning notification;

FIG. 7 is a view for explaining the related art.

EXEMPLARY EMBODIMENTS

The first exemplary embodiment of the present invention will be explained.

The present invention is characterized in that a plurality of the line cards are installed on the layer 2 switch, and that the FDB (Forwarding Database) table being referenced in order to transfer the packets can be effectively learned in the apparatus in which each line card performs the packet process.

The first exemplary embodiment defines one line card, out of a plurality of the line cards, as a representative line card, and concentrates the learning notifications being transmitted inside the apparatus on the representative line card, thereby allowing the packets to be appropriately controlled and the packets to be appropriately learned not only when a large volume of learning packets come but also when a load upon the CPU is high.

Next, a configuration of the first exemplary embodiment of the present invention will be explained.

Figure 1:
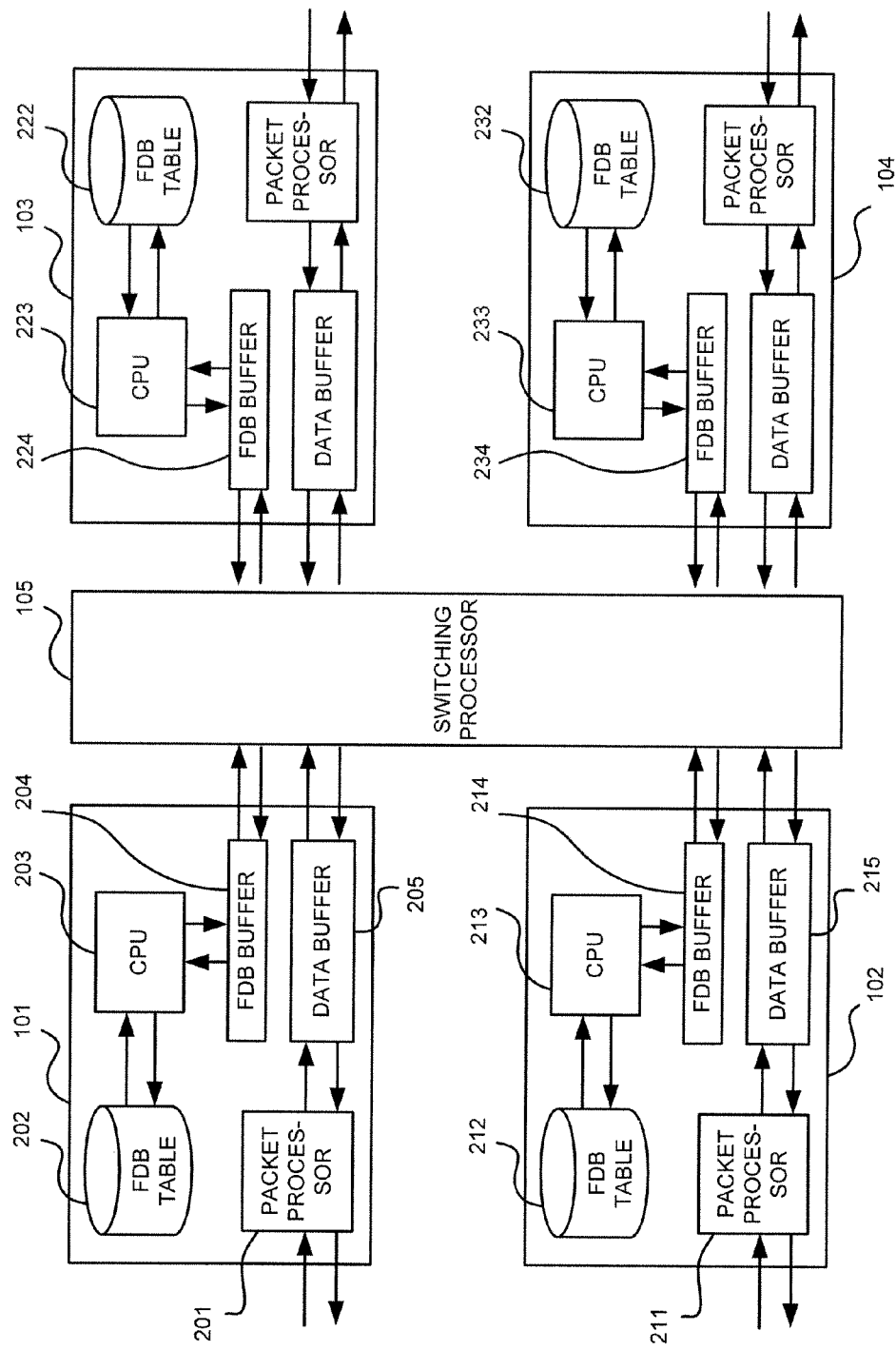
FIG. 1 is a block diagram of a first exemplary embodiment.

FIG. 1 is a block diagram of the first exemplary embodiment.

As shown in FIG. 1, the first exemplary embodiment is configured of a plurality of line cards 101, 102, 103, and 104, and a switching processor 105, being the layer 2 switch.

The line cards 101, 102, 103, and 104 include packet processors 201, 211, 221, and 231, FDB tables 202, 212, 222, and 232, CPUs 203, 213, 223, and 233, FDB buffers 204, 214, 224, and 234, and data buffers 205, 215, 225, and 235, respectively.

The first exemplary embodiment roughly operates as follow.

Additionally, while explanation is made with the line card 101 defined as the representative line card in the first exemplary embodiment, the other line cards could be the representative line card. Further, the method of deciding the representative line card is arbitrary, for example, the method of selecting the lower-numbered slot number may be employed, and only one is decided.

Herein, it is assumed that the line card 102 receives a new packet. In this case, the packet processor 211 of the line card 102 references the FDB table 212, defines the above packet as an unlearned packet when the corresponding entry is not present, and transmits the learning notification to the FDB buffer 204 of the representative line card 101 via the switching processor 105. Further, the received packet itself cannot solve the address, whereby the packet processor 211 transmits the learning notification to the data buffer 215 in order to copy-transfer it to all ports as a flooded packet similarly to the case of the normal layer 2 switch.

The CPU 203 of the representative line card 101 loads the packet (learning notification) necessary for the learning from the FDB buffer 204, searches the FDB table 202, and confirms whether the identical entry exists. When no entry (registration) exists, the CPU 203 registers the above packet to the FDB table 204. And, the CPU 203 multicasts the learning packet to the FDB buffers 214, 224, and 234 of all other line cards 102, 103, 104.

The CPUs 213, 223, and 233 of the line cards 102, 103, 104 having received the learning notification from the representative line card 101 perform the registration to the FDB tables 212, 222, and 232 that the CPUs 213, 223, and 233 manage, respectively.

As described above, in the exemplary embodiment, the unlearned packet is flooded similarly to the operation of the normal layer 2 switch. In this exemplary embodiment, the learning notification is cancelled when the learning notification cannot be accumulated into the FDB buffer of the representative line card 101, whereby it becomes impossible to perform the learning only in the entirety of the apparatus even though the learning notification is cancelled, and disagreement of the FDB tables can be avoided. The learning notification is also issued to the packet that was not able to be learned at the time of the next reception, whereby the above packet can be learned next time.

In addition, at the moment that the representative line card 101 multicasts the learning packet to the line cards 102, 103, and 104, the FDB buffer 204 of the representative line card 101 performs a flow rate restriction, and restricts the quantity of the learning packet to a quantity that the CPU 203 can receive, thereby allowing the quantity of the learning notification to be restricted to a suitable quantity that the CPU can process. The technologies such as shaping and polishing can cope with the flow rate restriction. And, each of the FDB tables 212, 222, and 232 of the line cards 102, 103, 104 learns only with the learning notification coming from the representative 101, whereby the quantity of the learning notification packet that the CPU should process can be controlled in all the line cards, which makes it possible to suppress the cancellation of the learning notifications inside the apparatus, and to process the notification having an appropriate quantity.

Next, a specific operation of the above-described configuration will be explained.

At first, operations of the line cards 102, 103, and 104 each of which is not the representative line card 101 will be explained. Additionally, operations of the line cards 102, 103, and 104 are similar to each other, so the line card 102 will be exemplified for explanation.

Figure 2:
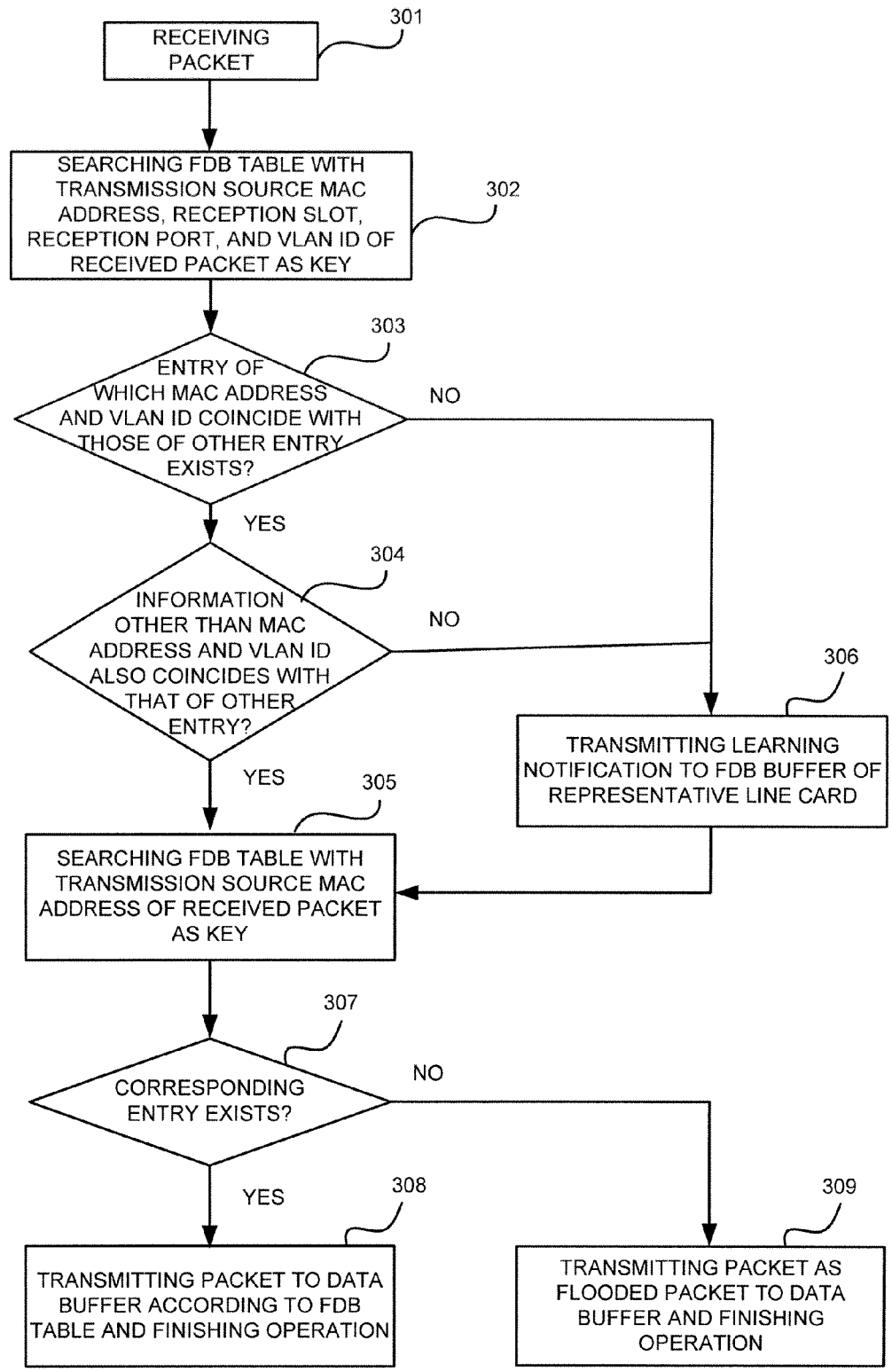
FIG. 2 is a flowchart for explaining an operation of a packet processor 211 of a line card 102.

FIG. 2 is a flowchart for explaining an operation of the packet processor 211 of the line card 102. FIG. 3 is a view for illustrating one example of a configuration of the FDB table 212.

In FIG. 2, the packet processor 211 searches the FDB table with a reception port number, a reception slot number, a VLAN ID, and a transmission source MAC address of the received packet as a search key (step 302).

Each entry of the FDB table 212 is configured of the port number, the slot number, the VLAN ID, and the MAC address as shown in FIG. 3. When the entry of which the MAC address and the VLAN ID, out of the search keys, coincide with those of the other entry, respectively, exists, (Step 303), the packet processor 211 confirms whether the other search keys (the reception slot number and the reception port number) coincide with those of other entry, respectively (Step 304), determines that the packet is a already-learned packet when the other search keys coincide with those of the other entry, respectively, and proceeds to the transmission process.

On the other hand, when the entry of the MAC address and the VLAN ID coincide with those of the other entry, respectively, does not exist, or when the other search keys do not coincide with those of the other entry, respectively, even though the above entry exists, the packet processor 211 transmits the learning notification as a new learning packet that is addressed to the FDB buffer 204 of the representative line card 101 (Step 306). In FIG. 4, information being included in the learning notification is shown. The reception slot number, the reception port number, the transmission source MAC address, and the reception VLAN ID are included in the learning notification.

In the transmission process, the packet processor 211 searches the FDB table with the transmission source MAC address of the received packet defined as a key (Step 305). When the corresponding entry exists in the FDB table 212, the packet processor 211 transmits the packet to the data buffer that is addressed to the port, the slot, and the VLAN ID described in the FDB table 212 (Step 308).

When no corresponding entry exists, the packet processor 211 transmits the packet as the unlearned packet, being the flooded packet, to the data buffer (Step 309).

Next, an operation of the representative line card 101 will be explained.

Figure 5:
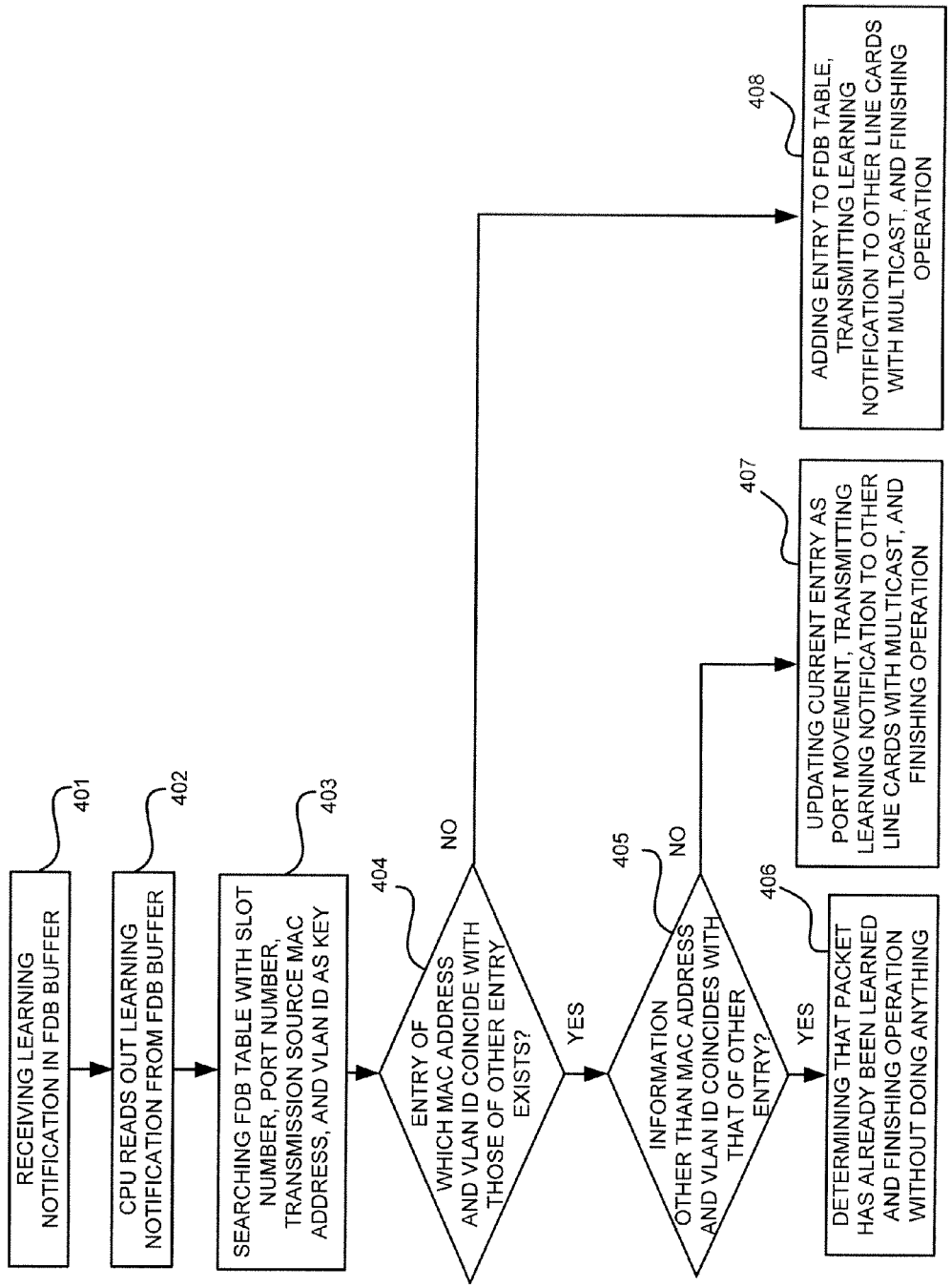
FIG. 5 is a flowchart for explaining an operation of the representative line card.

FIG. 5 is a flowchart for explaining an operation of the representative line card.

When the learning notification is received by the FDB buffer 204 (Step 401), the CPU 203 reads out the learning notification from the FDB buffer 204 (Step 402). The CPU 203 searches the FDB table 202 to confirm whether the entry of which the MAC address and the VLAN ID coincide with those of the other entry, respectively, exists from information of the read-out learning notification (Step 404).

When no corresponding entry exists, the CPU 203 adds the entry to the FDB table 202, and transmits a learning notification identical to the received learning notification to the other line cards with a multicast (Step 408).

On the other hand, when the corresponding entry exists, the CPU 203 confirms whether the information other than the MAC address and the VLAN ID of the learning notification coincide with that of the other entry. When the information coincides with that of the other entry, the CPU 203 determines that the packet has already been learned, and finishers the operation without doing anything (Step 406). When the information does not coincide with that of the other entry, the CPU 203 determines that a port movement has occurred, updates the corresponding entry of the FDB table 202 to the information of the learning notification, and transmits a learning notification identical to the received learning notification to the other line cards with a multicast (Step 407).

Continuously, an operation of the line card 102 having received the learning notification from the representative line card 101 will be explained.

Figure 6:
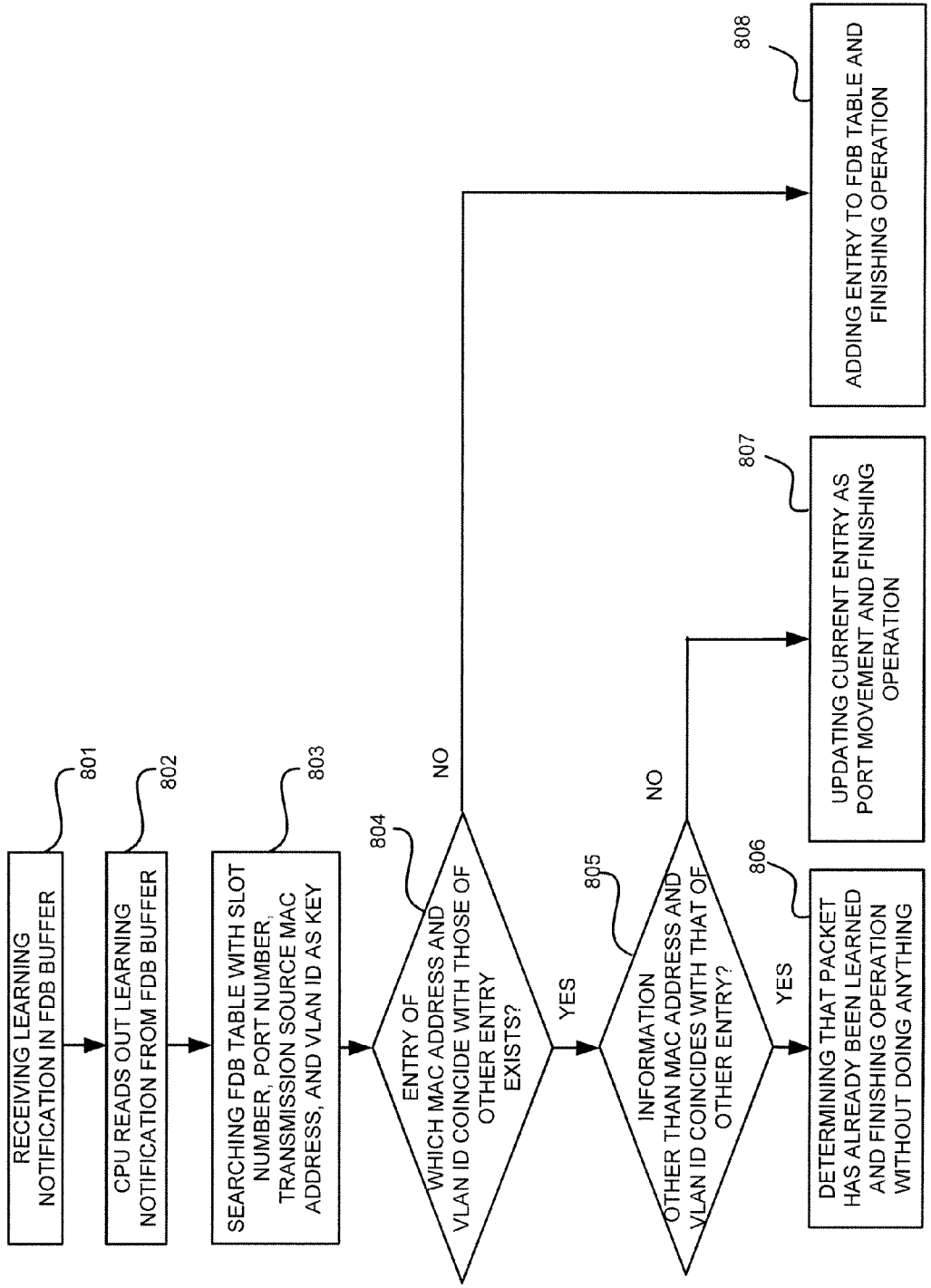
FIG. 6 is a flowchart for explaining an operation of the line card 102 having received the learning notification from the representative line card.

FIG. 6 is a flowchart for explaining an operation of the line card 102 having received the learning notification from the representative line card.

When the learning notification is received by the FDB buffer 214 (Step 801), the CPU 213 reads out the learning notification from the FDB buffer (Step 802). The CPU 213 searches the FDB table 212 to confirm whether the entry of which the MAC address and the VLAN ID coincide with those of the other entry, respectively, exists from the information of the read-out learning notification (Step 804).

When no corresponding entry exists, the CPU 213 adds the entry to the FDB table 212 and finishes the operation (Step 808).

On the other hand, when the corresponding entry exists, the CPU 213 confirms whether the information other than the MAC address and the VLAN ID coincides with that of the other entry. When the information coincides with that of the other entry, the CPU 213 determines that the packet has already been learned, and finishers the operation without doing anything (Step 806). When the information does not coincide with that of the other entry, the CPU 213 determines that a port movement has occurred, updates the corresponding entry of the FDB table 212 to the information of the learning notification, and finishes the operation (Step 807).

In such a manner, the line cards other than the representative line card, which perform the process similar to the case of the representative line card as the operation, finish the operation without transmitting the learning notification.

Additionally, as can be seen from the above-described explanation, each unit can be configured with hardware; however, it can be also configured with a computer program. In this case, a processor that operates under a program stored in a program memory allows a function and an operation similar to each of the above-described exemplary embodiments to be realized.

Further, it is also possible to realize only the function of one part of the above-described exemplary embodiments with the computer program.

Further, the content of the above-mentioned exemplary embodiments can be expressed as follows.

(Supplementary note 1) A switch system, comprising a layer 2 switching processor and a plurality of line cards connected to said layer 2 switching processor, said plurality of line cards including at least one representative line card:

wherein each line card excluding said representative line card comprises:

an FDB table having FDB information entried therein;

a packet processing unit that, when the FDB information of a received packet has not been entried into said FDB table of its own line card, transmits a learning notification including said FDB information to said representative line card via said layer 2 switching processor; and an updating unit that receives the learning notification including the FDB information coming from said representative line card via said layer 2 switching processor, and updates said FDB table of its own line card; and wherein said representative line card comprises:

an FDB table having the FDB information entried therein; and a learning unit that receives the learning notification coming from said line card via said layer 2 switching processor, determines whether the FDB information of said learning notification has been entried into said FDB table of its own line card, updates the FDB table of its own line card when said FDB information has not been entried, and transmits the learning notification including said FDB information to the other line cards via said layer 2 switching processor with a multicast.

(Supplementary note 2) A switch system according to Supplementary note 1, wherein said learning unit of the representative line card controls a flow rate of said learning notification.

(Supplementary note 3) A switch system according to Supplementary note 2, wherein said learning unit of the representative line card comprises an FDB buffer for accumulating the learning notifications coming from the other line cards, and controls a flow rate of the learning notification by said FDB buffer so that the learning notification can be processed.

(Supplementary note 4) A switch system according to one of Supplementary note 1 to Supplementary note 3, wherein when the FDB information of the received packet has not been entried into said FDB table of its own line card, said packet processing unit of the line card transmits said received packet as a flooded packet.

(Supplementary note 5) A representative line card in a switch system that is configured of a layer 2 switching processor and a plurality of line cards connected to said layer 2 switching processor, said plurality of line cards including at least one representative line card, comprising:

an FDB table having FDB information entried therein, and;

a learning unit that receives a learning notification including the FDB information from the other line cards excluding its own line card via said layer 2 switching processor, determines whether the FDB information of said learning notification has been entried into said FDB table of its own line card, updates the FDB table of its own line card when said FDB information has not been entried, and transmits the learning notification including said FDB information to the other line cards via said layer 2 switching processor with a multicast.

(Supplementary note 6) A line card in a switch system that is configured of a layer 2 switching processor and a plurality of line cards connected to said layer 2 switching processor, said plurality of line cards including at least one representative line card, comprising:

an FDB table having FDB information entried therein;

a packet processing unit that, when the FDB information of a received packet has not been entried into said FDB table of its own line card, transmits a learning notification including said FDB information to said representative line card via said layer 2 switching processor; and an updating unit that receives the learning notification including the FDB information coming from said representative line card via said layer 2 switching processor, and updates said FDB table of its own line card.

(Supplementary note 7) A learning method of FDB information of a line card in a switch system that is configured of a layer 2 switching processor and a plurality of line cards connected to said layer 2 switching processor, said learning method comprising:

defining one line card out of said plurality of line cards as a representative line card;

when the FDB information of a received packet has not been entried into an FDB table of its own line card, transmitting, by each line card excluding said representative line card, a learning notification including said FDB information to said representative line card via said layer 2 switching processor;

receiving, by said representative line card, the learning notification from said line card via said layer 2 switching processor, determining, by said representative line card, whether the FDB information of said learning notification has been entried into the FDB table of its own line card, updating, by said representative line card, the FDB table of its own line card when said FDB information has not been entried, and transmitting, by said representative line card, the learning notification including said FDB information to the other line cards via said layer 2 switching processor with a multicast; and receiving, by each line card excluding said representative line card, the learning notification including the FDB information coming from said representative line card via said layer 2 switching processor, and updating, by each line card excluding said representative line card, said FDB table of its own line card.

(Supplementary note 8) A learning method of FDB information according to Supplementary note 7, wherein said learning unit of the representative line card controls the learning notification coming from the other line cards at a level of a controllable quantity.

(Supplementary note 9) A program of a representative line card in a switch system that is configured of a layer 2 switching processor and a plurality of line cards connected to said layer 2 switching processor, said program causing a CPU of the representative line card to execute:

a process of, upon receipt of a learning notification including FDB information from the other line cards excluding its own line card via said layer 2 switching processor, determining whether the FDB information of said learning notification has been entried into an FDB table of its own line card; and a process of updating the FDB table of its own line card when said FDB information has not been entried, and transmitting the learning notification including said FDB information to the other line cards via said layer 2 switching processor with a multicast.

(Supplementary note 10) A program of a line card in a switch system that is configured of a layer 2 switching processor and a plurality of line cards connected to said layer 2 switching processor, said plurality of line cards including at least one representative line card, said program causing a CPU of the line card to execute:

a process of, when FDB information of a received packet has not been entried into an FDB table of its own line card, transmitting a learning notification including said FDB information to said representative line card via said layer 2 switching processor; and a process of receiving the learning notification including the FDB information coming from said representative line card via said layer 2 switching processor, and updating said FDB table of its own line card.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A switch system, comprising a layer 2 switching processor and a plurality of line cards connected to said layer 2 switching processor, said plurality of line cards including at least one representative line card:
    wherein each line card excluding said representative line card comprises:
        an FDB table having FDB information entried therein;
        a packet processing unit that, when the FDB information of a received packet has not been entried into said FDB table of the line card, transmits a learning notification including said FDB information to said representative line card via said layer 2 switching processor; and
        an updating unit that receives the learning notification including the FDB information coming from said representative line card via said layer 2 switching processor, and updates said FDB table of the line card; and
    wherein said representative line card comprises:
        an FDB table having the FDB information entried therein; and
        a learning unit that receives the learning notification coming from said line card via said layer 2 switching processor, determines whether the FDB information of said learning notification has been entried into said FDB table of the representative line card, updates the FDB table of the representative line card when said FDB information has not been entried, and transmits the learning notification including said FDB information to the other line cards via said layer 2 switching processor with a multicast;
    wherein said learning unit of the representative line card controls a flow rate of said learning notification; and
    wherein said learning unit of the representative line card comprises an FDB buffer for accumulating the learning notifications coming from the other line cards, and controls a flow rate of the learning notification by said FDB buffer so that the learning notification can be processed.

2. The switch system according to claim 1, wherein when the FDB information of the received packet has not been entried into said FDB table of the line card, said packet processing unit of the line card transmits said received packet as a flooded packet.

3. A representative line card in a switch system that is configured of a layer 2 switching processor and a plurality of line cards connected to said layer 2 switching processor, said plurality of line cards including at least one representative line card, comprising:
    an FDB table having FDB information entried therein;
    a learning unit that receives a learning notification including the FDB information from the other line cards excluding its own line card via said layer 2 switching processor, determines whether the FDB information of said learning notification has been entried into said FDB table of the representative line card, updates the FDB table of the representative line card when said FDB information has not been entried, and transmits the learning notification including said FDB information to the other line cards via said layer 2 switching processor with a multicast;
    wherein said learning unit of the representative line card controls a flow rate of said learning notification; and
    wherein said learning unit of the representative line card comprises an FDB buffer for accumulating the learning notifications coming from the other line cards, and controls a flow rate of the learning notification by said FDB buffer so that the learning notification can be processed.

4. A line card in a switch system that is configured of a layer 2 switching processor and a plurality of line cards connected to said layer 2 switching processor, said plurality of line cards including at least one representative line card, comprising:

an FDB table having FDB information entried therein;
a packet processing unit that, when the FDB information of a received packet has not been entried into said FDB table of the line card, transmits a learning notification including said FDB information to said representative line card via said layer 2 switching processor;
an updating unit that receives the learning notification including the FDB information coming from said representative line card via said layer 2 switching processor, and updates said FDB table of the line card;
wherein a learning unit of the representative line card controls a flow rate of said learning notification; and
wherein said learning unit of the representative line card comprises an FDB buffer for accumulating the learning notifications coming from the other line cards, and controls a flow rate of the learning notification by said FDB buffer so that the learning notification can be processed.

5. A learning method of FDB information of a line card in a switch system that is configured of a layer 2 switching processor and a plurality of line cards connected to said layer 2 switching processor, said learning method comprising:
defining one line card out of said plurality of line cards as a representative line card;
when the FDB information of a received packet has not been entried into an FDB table of the line card, transmitting, by each line card excluding said representative line card, a learning notification including said FDB information to said representative line card via said layer 2 switching processor;
receiving, by said representative line card, the learning notification from said line card via said layer 2 switching processor, determining, by said representative line card, whether the FDB information of said learning notification has been entried into the FDB table of the representative line card, updating, by said representative line card, the FDB table of the line card when said FDB information has not been entried, and transmitting, by said representative line card, the learning notification including said FDB information to the other line cards via said layer 2 switching processor with a multicast;
receiving, by each line card excluding said representative line card, the learning notification including the FDB information coming from said representative line card via said layer 2 switching processor, and updating, by each line card excluding said representative line card, said FDB table of the line card;
wherein a learning unit of the representative line card controls a flow rate of said learning notification; and
wherein said learning unit of the representative line card comprises an FDB buffer for accumulating the learning notifications coming from the other line cards, and controls a flow rate of the learning notification by said FDB buffer so that the learning notification can be processed.

6. A learning method of FDB information according to claim 5, wherein said learning unit of the representative line card controls the learning notification coming from the other line cards at a level of a controllable quantity.

7. A switch system according to claim 1, wherein when the FDB information of the received packet has not been entried into said FDB table of the line card, said packet processing unit of the line card transmits said received packet as a flooded packet.

8. The learning method of FDB information according to claim 5, wherein when the FDB information of the received packet has not been entried into said FDB table of the line card, said packet processing unit of the line card transmits said received packet as a flooded packet.

* * * * *